United States Patent [19]

Robinson

[11] 4,364,132
[45] Dec. 21, 1982

[54] AQUARIUM BATH

[76] Inventor: Lawrence D. Robinson, 11077 Minden, Detroit, Mich. 48205

[21] Appl. No.: 182,818

[22] Filed: Aug. 29, 1980

[51] Int. Cl.³ .................... E03C 1/20; A47K 3/02
[52] U.S. Cl. .................................. 4/546; 4/538; 4/584; 4/661
[58] Field of Search .............. 4/584, 661, 487, 539, 4/538, 556

[56] References Cited

U.S. PATENT DOCUMENTS

| | | | |
|---|---|---|---|
| D. 49,658 | 9/1916 | Papp | 4/539 |
| 746,390 | 12/1903 | Schmidt | 4/556 |
| 1,854,578 | 4/1932 | Catto | 4/584 |
| 2,533,534 | 12/1950 | Tellefsen | 4/538 |
| 3,248,741 | 5/1966 | Stout et al. | 4/539 |
| 4,267,609 | 5/1981 | Altman et al. | 4/584 |

*Primary Examiner*—Henry K. Artis
*Attorney, Agent, or Firm*—Irving M. Weiner; Pamela S. Burt; John L. Shortley

[57] ABSTRACT

A bath tub having inner and outer front, rear and side walls, a ledge extending along the tops of these walls, a base uniting the inner and outer walls, and the whole forming a water-tight chamber extending around the tub. A cover is provided in a ledge of the tub. The cover provides an access opening, and there is also an aeration opening, for admission of air to water in the chamber and for servicing of the chamber. The chamber can be used for fish to thus provide an aquarium-tub combination.

9 Claims, 7 Drawing Figures

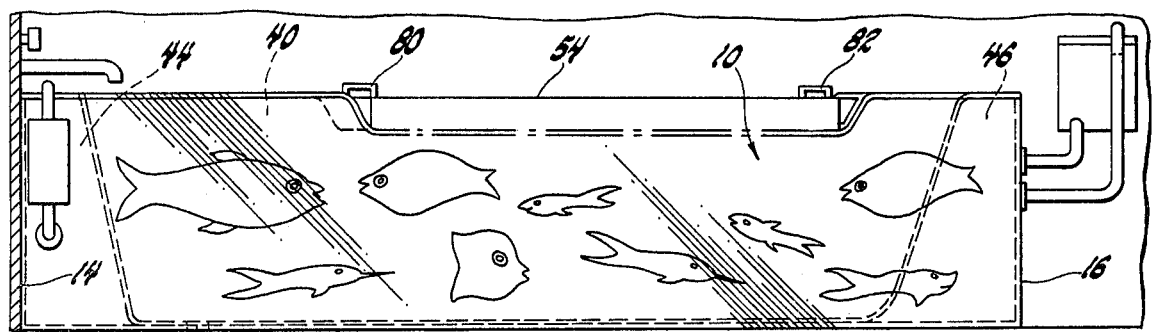
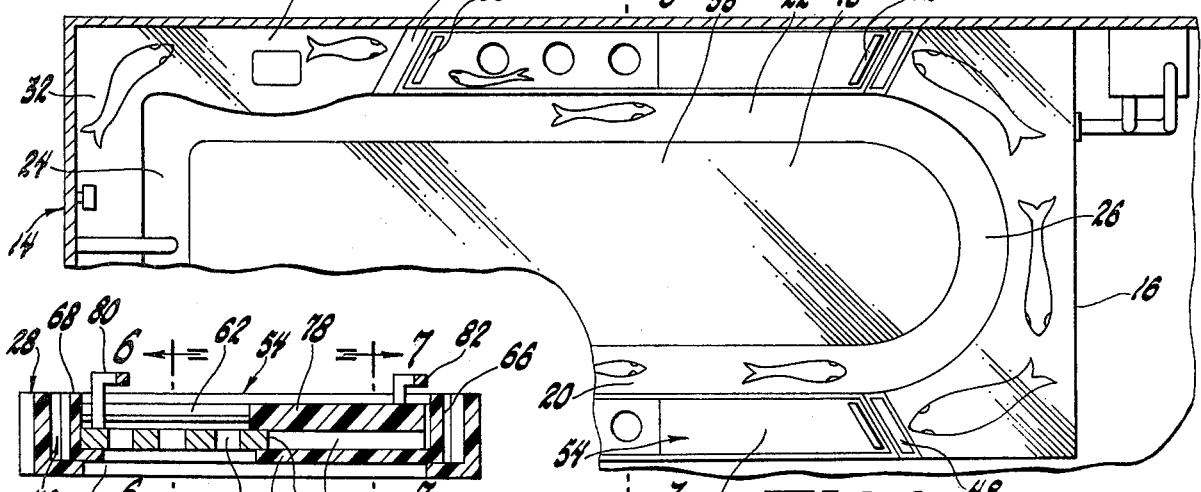
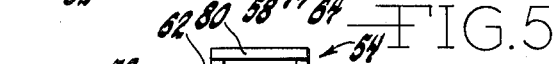
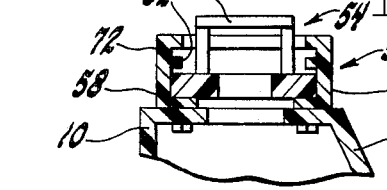
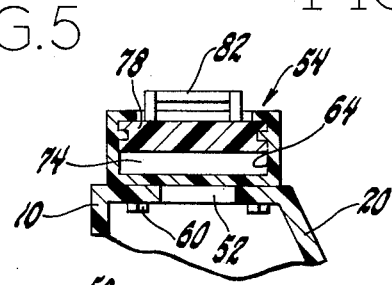
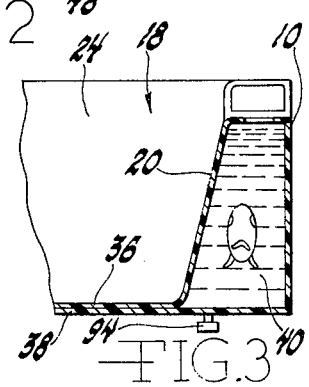
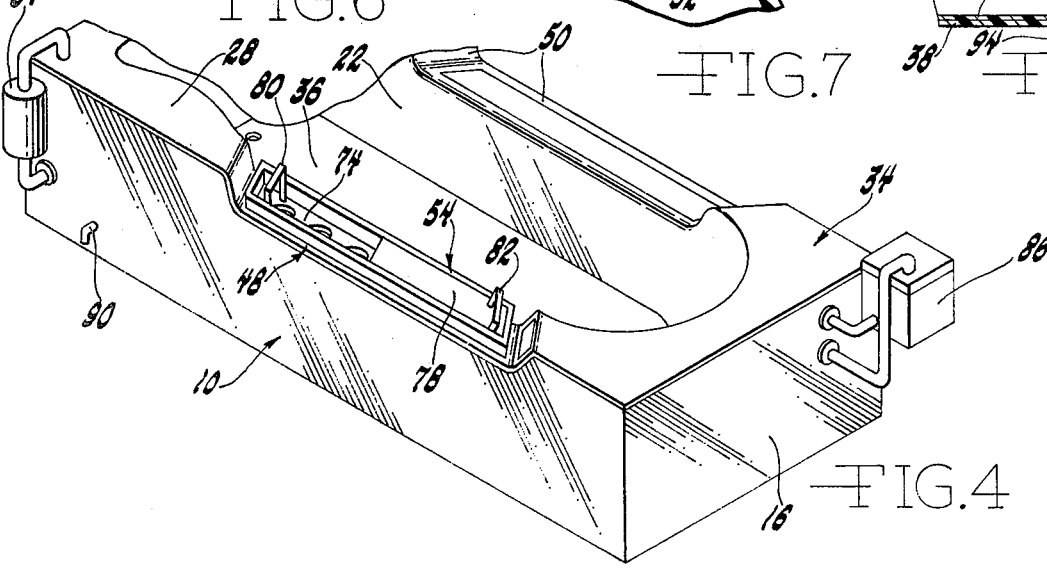

AQUARIUM BATH

This invention relates to a bathing fixture or tub such as ordinarily employed in the home, which also is an aquarium. The device may be used in the normal manner in the typical home bathroom, but it also provides the unique feature of an aquarium. The aquarium is so related to the bathing section of the tub that a bather will be literally surrounded by the aquarium creatures and/or plants while taking his or her bath. At other times the size of the aquarium provides a very desirable environment for the fish or other creatures that may be selected by the user.

BACKGROUND OF THE INVENTION

Baths of many different types have been provided throughout the years, everything from Roman baths to the present commercially available standard size bathtubs that are employed in the average home. The latter are typically mounted on the floor, however they are also placed on raised sections, or they are sunken. Often they are also mounted in separate enclosures. They have various shapes; some have seats within them, some do not, etc.

Aquariums also have been on the scene for many many years. They are also available in many different sizes and shapes and with various features. Many are relatively simple, small enclosures which can be placed on tables or stands, others are quite substantial in size and are more permanent in mounting. All are usually provided with filtering means, an air supply system, pumps and other devices for use in maintaining the aquarium in a condition suitable for the fish, etc.

So far as known to the instant applicant, no one has heretofore provided a combined bath and aquarium for typical home use. Particularly there has not been heretofore an aquarium bath in which the bather is within the center of the aquarium while taking his or her bath. Nor has there been provided an aquarium which can be placed against walls in the manner in which the typical bathtub might be positioned and yet has a full tub for bathing surrounded by the wall engageable aquarium.

SUMMARY OF THE INVENTION

The present invention relates to a bathtub which is adapted to be placed in the typical bathroom in place of the standard tub usually available, and which incorporates within it an aquarium which is of interest to the bather. The aquarium also serves in the usual fashion as an aquarium to keep fish etc., in a healthy condition. According to the invention a bathtub-aquarium device is provided which has outer front rear and end walls which can be butted against or recessed within partitions or walls in the same manner as a bathtub. The tub has a floor member which extends from sidewall to sidewall and endwall to endwall and forms with these outer walls and with a bathing section of the tub an enclosed water chamber. The chamber extends completely around the bathing section of the tub. The tub has a relatively horizontal side ledge interconnecting the bathing section and at least one of the side walls. Access to the water chamber of the aquarium portion of the tub is obtained through a cover in the ledge formed between one of the sidewalls and the bathing section. The cover comprises a member slidable along the ledge to alternately open and close the access opening to the water chamber. A second movable member is movable over the first mentioned cover member. The first cover member has openings to permit air to enter to the aquarium, whereas the second cover member is adapted to be placed over these openings to close them during a bath, or when the tub might be cleaned. The side ledge has a recessed section, and the access openings and covers are in that recessed section.

The aquarium-tub also includes a filter means and has a water tap connection as well as a drain connection. Further, there is a level indicating means provided to make it easy to determine the level in the tank. According to one feature of the invention the inner bathing portion of the invention slopes inwardly and downwardly from the ledges surrounding the tub-aquarium.

Another feature of the invention is the provision of means for readily obtaining access to the aquarium section for the necessary periodic cleaning, removal and replacement of fish, etc.

Another interesting aspect of the invention is that the tub is made of transparent materials. This permits vision of the aquarium section from both the bathing portion and from outside the tub.

A further feature is the provision of an aquarium which extends entirely around the bathing section. The fish and/or other creatures can thus have a complete path for their activities and will be healthier than if confined in a smaller section.

These and other features of the invention will become apparent from a perusal of the follow drawings and accompanying description.

BRIEF DESCRIPTION OF THE DRAWINGS

FIG. 1 is a side elevational view of a tub-aquarium constructed according to the invention.

FIG. 2 is a top plan view.

FIG. 3 is a sectional view taken along line 3—3 of FIG. 2.

FIG. 4 is a perspective view.

FIG. 5 is a sectional view taken along line 5—5 of FIG. 2.

FIG. 6 is a sectional view taken along line 6—6 of FIG. 5.

FIG. 7 is a sectional view taken along line 7—7 of FIG. 5.

DETAILED DESCRIPTION OF THE DRAWINGS

With reference to FIGS. 1-6 a bathtub-aquarium constructed in accordance with the invention comprises a tub having another front wall 10, an outer rear wall 12, and two outer side walls 14 and 16.

A central bathing section 18, having front, rear and side walls 20, 22, 24 and 26 is positioned within the outer wall members.

Upper front ledge or shelve member 28, rear ledge 30 and side ledges 32 and 34 joined the wall sections of the central bath section with the outer wall sections. The inner tub-like bathing section 18 has a base or bottom 36. Likewise a base or floor 38 extends between the walls 10 and 12 and the walls 14 and 16. The two bases 36 and 38 are joined by a suitable adhesive. These wall sections and floor sections together form the inner central bath section and the aquarium chamber. The aquarium chamber consists of the front rear and side water-receiving chambers 40, 42, 44 and 46.

The upper shelf-like members form ledges similar to those provided on the ordinary bathtub. Preferably according to the invention along the front and rear shelves there are provided recessed sections 48 and 50. These sections are substantially mid-way of the front and rear sections of the tub.

As shown in FIGS. 5, 6 and 7, each one of these recessed sections has an upper opening 52 extending a substantial distance along the respective ledge. Each opening 52 is formed within the ledge such as 48.

An access unit 54 is positioned over each of the openings 52 in each one of the ledges 48 and 50. The access unit comprises a housing 56 having a base 58 which is secured to the ledge preferably by adhesives, although fasteners such as 60 can be used.

Within the housing 56 there is an upper channel 62 and a lower channel 64 formed by end plates 66 and 68 and side plates 70 and 72.

A first slide plate 74 is received within the lower channel 64. The slide plate has several openings 76 which expose the water within the aquarium tank to the atmosphere. The plate 74 can be slid along its channel from the position shown in FIG. 5 to the right hand portion of the access unit. When it is in this position the opening 52 is fully exposed. When this is done it is easier to clean and otherwise to tend to the aquarium.

A second slide plate 78 is mounted within the upper channel 62. This slide plate is adapted to be slide from the position in which it is shown in FIG. 5 to a position in which it is entirely to the left. The second plate 78 is solid and does not have openings such as 76. The lower portion 77 of unit 54 closes opening 52 to the right, as viewed in FIG. 5. The second plate is used to close the opening 76 when there is bathing or cleaning of the inner bathing section of the tub or the exterior of the unit. This prevents soap or other chemicals from getting into the aquarium. The plate 74 has a handle 80 and the plate 78 and likewise has a handle 82 to facilitate movement of these plates. The tub-aquarium can be formed of fiberglass or other materials. Preferably it is transparent on all sides so the fish can be viewed from the outside as well as the inside of the tub. The access unit is made of the same material, preferably, so as to avoid any corrosion problems. Weep holes or the like can be provided in the bases of the access units so that fluid that might get into a unit will find a ready way out and cleaning will be facilitated.

A water level indicator 84 can be provided at the side of the aquarium section. This would serve not only to indicate the level of the water within the aquarium, but also its condition. This would be particularly useful should the tank wall be nontransparent on its exterior.

A filter unit 86 can also be provided on one side of the aquarium section. This can be provided with a small pump to constantly flow water through the filter.

It is also obvious that an aerating device 88 can also be provided.

When the unit is mounted adjacent walls in the typical manner in which modern tubs are mounted, these aerating devices, etc. can be mounted within the wall itself and access can be provided thereto by a panel at the other side of the wall.

A drain such as 90 can also be provided. It is further obvious that the chamber of the aquarium can be drained by syphoning for example, by using a hose extending into the drain 92 of the tub of the bathing section.

The usual faucets and spigots can be provided as can shower equipment, etc.

From the above it will be seen that the chamber formed within the walls of the tub forms an aquarium. The aquarium extends completely around the bathing section, thus anyone in the tub can see the interesting features in the aquarium from whatever position he or she may be sitting.

It would further be seen that the aquarium has an easy means for tending to the creatures in the aquarium and for cleaning and otherwise treating the aquarium section. Likewise there is provided a means of access to the atmosphere as well as a means for closing that access to prevent soaps and the like from getting into the aquarium.

The tub can be entered in the same manner as any tub, it can also be cleaned and maintained in the same manner. The plumbing fixtures for the tub are separate and independent from those for the aquarium and one need not suffer from the functioning or malfunctioning of the other.

I claim:

1. An aquarium bath comprising:
   a tub having inner front, rear, and side walls united to form a bathing compartment;
   said tub further having outer front, outer rear and outer side walls;
   a ledge extending along the upper perimeter of at least said inner and said outer front walls and of said side walls;
   a base extending between and uniting the outer and inner front and side walls and the outer and inner rear walls;
   said walls, said base and said ledge being united to form a continuous water tight water chamber between at least said inner front and inner side walls and said outer front and outer side walls; and
   an access and aeration means for said water chamber including a cover in said ledge formed between one of said outer side walls and said bathing compartment to provide for admission of air to the water in said chamber and for servicing said chamber while water is contained in said chamber.

2. The tub of claim 1, wherein:
   said cover comprises a member slidable along said ledge to alternately open and close said access.

3. The apparatus of claim 2, wherein:
   said cover comprises a second slidable member movable over the first member;
   said first member having air openings extending therethrough;
   said second member constituting a cover for said air openings.

4. The tub of claim 3, wherein:
   said side ledge has a recessed horizontal section and said access means is in said section.

5. The tub of claim 1, including:
   a filter and level indicating means for said water chamber.

6. The tub of claim 1, wherein:
   said tub is formed of transparent material.

7. The tub of claim 1, wherein:
   said inner walls slope inwardly and downwardly from said ledge.

8. The tub of claim 1, wherein:
   said water chamber constitutes an aquarium.

9. The aquarium bath of claim 1, wherein:
   said ledge extends substantially horizontally and extends completely around said aquarium bath; and
   said ledge, said base, and said inner and outer walls forming a continuous water tight chamber extending completely around said bathing compartment.

* * * * *